United States Patent [19]

Watanabe

[11] Patent Number: 4,964,073
[45] Date of Patent: Oct. 16, 1990

[54] PORTABLE DATA COLLECTING AND PROCESSING APPARATUS

[75] Inventor: Hiroyuki Watanabe, Tokyo, Japan
[73] Assignee: Seiko Instruments Inc., Japan
[21] Appl. No.: 305,369
[22] Filed: Feb. 1, 1989
[30] Foreign Application Priority Data
  Feb. 12, 1988 [JP] Japan .................................. 63-31448
[51] Int. Cl.$^5$ ................................................ G06F 1/00
[52] U.S. Cl. ...................................................... 364/707
[58] Field of Search .............................. 364/707, 706
[56] References Cited
U.S. PATENT DOCUMENTS
  4,455,623 6/1984 Wesemeyer ........................... 364/707

FOREIGN PATENT DOCUMENTS
  0175935 4/1986 European Pat. Off. ............. 364/707

Primary Examiner—Gary V. Harkcom
Assistant Examiner—Long T. Nguyen
Attorney, Agent, or Firm—Bruce L. Adams; Van C. Wilks

[57] ABSTRACT

A portable data collecting and processing apparatus is operated at a low voltage at ordinary times when an operation of an information processing circuit is stopped and only at necessary time the information processing circuit is operated at a voltage to which a voltage of a battery is boosted, whereby power consumption is reduced.

3 Claims, 4 Drawing Sheets

PORTABLE DATA COLLECTING AND PROCESSING APPARATUS

BACKGROUND OF THE INVENTION

1. Field of the Invention

The present invention relates to a portable data collecting and processing apparatus, and more particularly to an improvement in such apparatus which realizes the reduction of the power consumption by stopping the operation of an information processing circuit, such as a CPU, and by operating it only in the case of necessity.

2. Description of the Prior Art

The recent improvement in the performance of electronic apparatus such as electronic data collecting and processing apparatus has been brought about by the progress of largescale integrated circuits, and this has resulted in a compact structure of the apparatus. However, since the operating voltage of a CPU and a memory in such apparatus is approximately 4.5 V is higher than a supply voltage of a battery, and the supply voltage of the battery used in such apparatus is 1.5 V, such batteries are connected in series so as to apply a high voltage to the circuit. It is thus impossible to reduce the size of the apparatus due to the space required for the batteries and it disadvantageously consumes a large power, since a surplus voltage is applied to circuits which can be operated at a voltage lower than the operating voltage of the CPU and memory.

SUMMARY OF THE INVENTION

An object of the present invention is to provide a portable data collecting and processing apparatus which is small in size and light in weight.

Another object of the present invention is to provide a portable data collecting and processing apparatus which realizes a reduction of the power consumption by operating an information processing circuit only in the case of necessity.

In order to attain these and other objects, the portable data collecting and processing apparatus according to the present invention is comprised of a power supply circuit consisting of a booster circuit for boosting the voltage of a battery, a voltage stabilizing circuit for stabilizing the boosted voltage and a diode, and a voltage control circuit for controlling the operation of the booster circuit by receiving a start signal from an input/output control circuit and an operation signal from the information processing circuit, whereby the apparatus is operated at a low voltage when the operation of the information processing circuit is stopped and is operated at a necessary voltage to which the voltage of a battery is boosted only when a higher voltage is needed. Therefore the power consumption is reduced and the size of the apparatus is reduced.

DESCRIPTION OF THE PREFERRED EMBODIMENT

Figure 1:
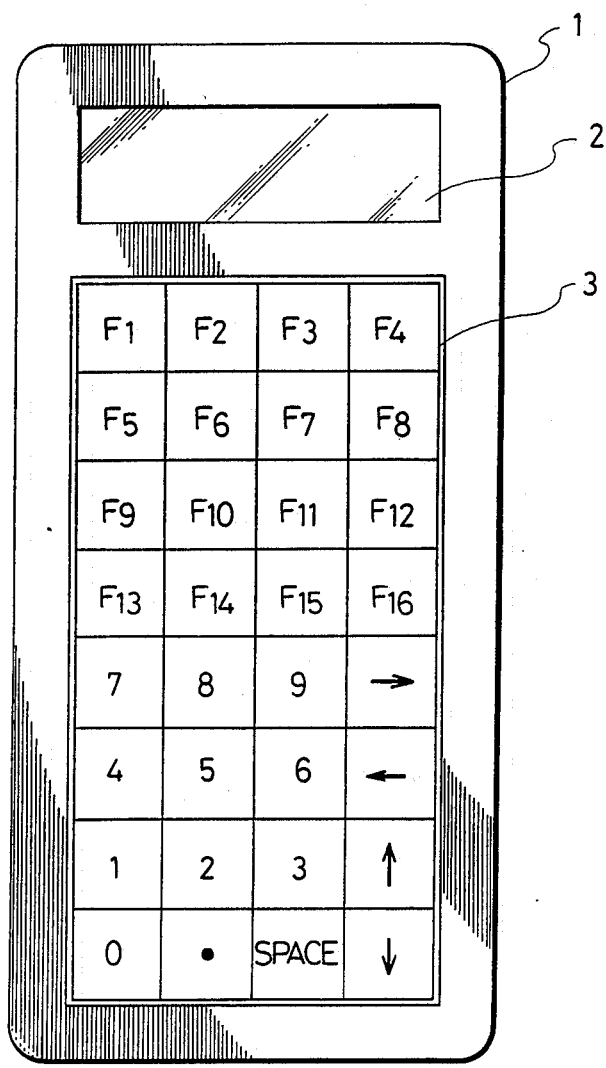
FIG. 1 is an elevational view of a portable data collecting and processing apparatus according to the present invention.

The present invention will be explained hereinunder with reference to the embodiment shown in the accompanying drawings. FIG. 1 shows an elevational view of a portable data collecting and processing apparatus according to the present invention. The portable data collecting and processing apparatus is comprised of a case 1 having a display 2, such as a liquid crystal display, and a keyboard 3 thereon. When a key of the keyboard 3 is depressed by user, a data or command inputted from the key is displayed on the display 2 and processed by an information processing circuit 11 shown in FIG. 2. A processed data or command outputted from the information processing circuit 11 is displayed on the display 2.

Figure 2:
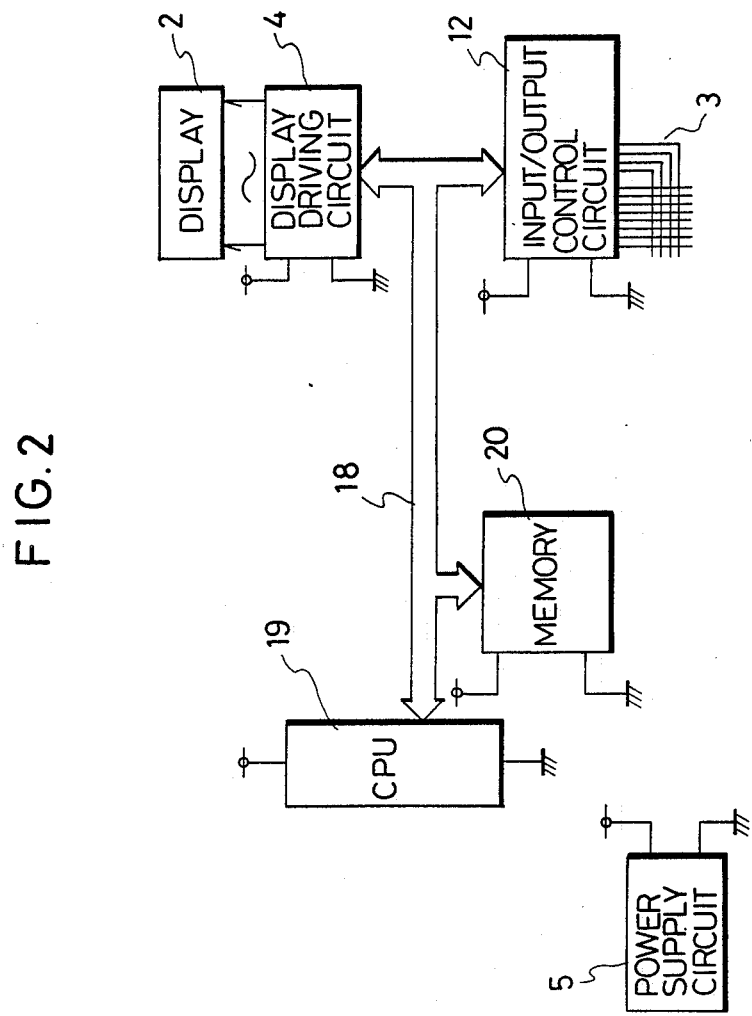
FIG. 2 is a schematic block diagram of the circuitry provided in the portable data collecting and processing apparatus shown in FIG. 1.

FIG. 2 shows a schematic block diagram of a circuit provided in the portable data collecting and processing apparatus shown in FIG. 1. The keyboard 3 is connected with an input/output control circuit 12. The display 2 is connected with a display driving circuit 4. The input/output control circuit 12 and the display driving circuit 4 are coupled with a memory 20 and a central processing unit or a CPU 19 by a bus 18. A power supply circuit 5 supplies electric power to the input/output control circuit 12, the display driving circuit 4, the memory 20 and the CPU 19. When the keyboard 3 is depressed to enter a data or a command by a user, the input/output control circuit 12 inputs a signal from the key depressed, codes the signal and outputs the coded signal to the CPU 19. The CPU 19 selects an address of the memory 20 corresponding to the coded signal from the input/output control circuit 12 and reads a program or a data stored in the memory 20. The CPU 19 processes the data in accordance with the program and outputs a processed data to the display driving circuit 4. The display driving circuit 4 decodes the processed data and outputs a decode signal to the display 2. The display 2 displays the input data or the processed data. The power supply circuit 5 supplies a voltage which is higher than the minimum operating voltage of CPU 19 when all the circuits discribed above operate normally.

Figure 3:
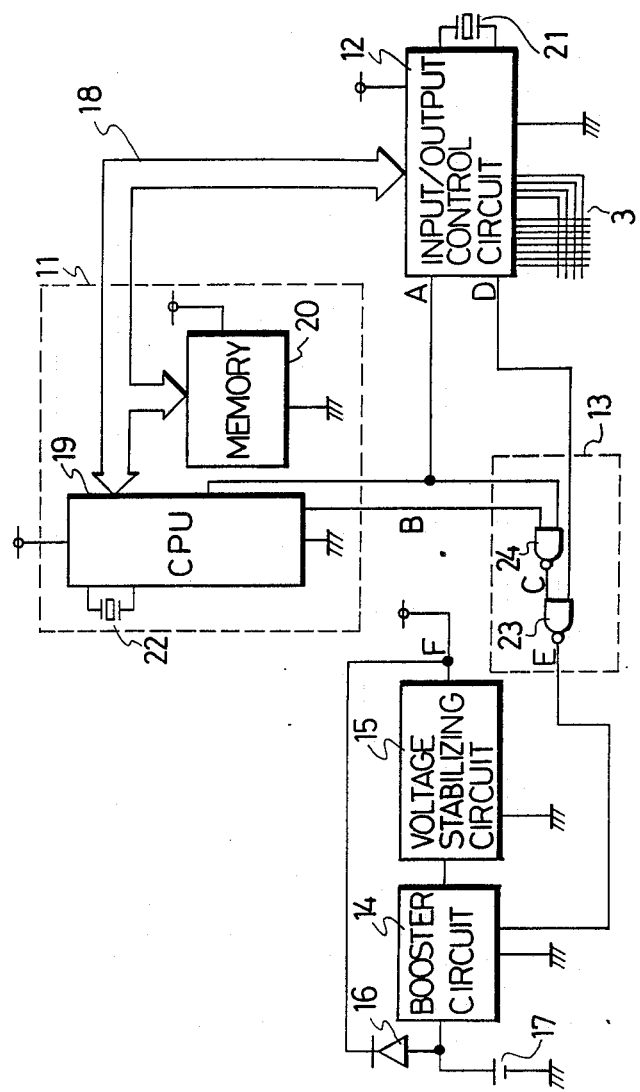
FIG. 3 is a circuit diagram showing a booster circuit and a voltage stabilizing circuit used in the power supply circuit shown in FIG. 2.

FIG. 3 shows a circuit diagram showing a booster circuit and a voltage stabilizing circuit which are used in the power supply circuit 5. The information processing circuit 11 is composed of the CPU 19 and the memory 20, a voltage control circuit 13 is composed of a 2-input NAND gate 23 and 2-input NAND gate 24, and a power supply circuit 5 is composed of a booster circuit 14, a voltage stabilizing circuit 15 and a diode 16. The CPU 19, the memory 20 and the input/output control circuit 12 are connected with each other by the bus 18, and the output B of the CPU 19 is connected to one input of the 2-input NAND gate 24. A quartz oscillator 21 is connected to the input/output control circuit 12 and the oscillation clock output D thereof is connected to one input of the 2-input NAND gate 23. A start signal A from the input/output control circuit 12 is connected to the CPU 19 and the other input of the 2-input NAND gate 24. The output C of the 2-input NAND gate 24 is connected to the other input of the 2-input NAND gate 23, and the output E of the 2-input NAND gate 23 is connected to the booster circuit 14. The output of a battery 17 is connected to the input of the diode 16 and the input of the booster circuit 14, and the output of the booster circuit 14 is connected to the input of the voltage stabilizing circuit 15. The output of the diode 16 and the output F of the voltage stabilizing circuit 15 are connected with each other, and are supplied to the CPU 19, the memory 20, the input/output control circuit 12 and the 2-input NAND gates 23 and 24 as a power source.

The operation of the circuitry will now be explained. At ordinary times, the operations of the CPU 19, the memory 20 and the booster circuit 14 are stopped and the voltage of the battery 7 is supplied to the circuitry as it is through the diode 16. The input/output control circuit 12 and the voltage control circuit 13 can be operated at this low voltage. The input/output control circuit 12 monitors the input state and when a key is depressed, the input/output control circuit 12 transmits the start signal A having logical low level to the voltage control circuit 13. The voltage control circuit 13 which has received the start signal from the input/output control circuit 12 supplies the oscillation clock output D sent from the input/output control circuit 12 in the form of the booster control signal E to the booster circuit 14 so as to boost the voltage of the battery. The boosted voltage is stabilized by the voltage stabilizing circuit 15 and supplied to all the circuitry. The information processing circuit 11 which has received the start signal A having logical low level from the input/output control circuit 12 operates the oscillating circuit 22 therein and when the oscillation is stabilized, the operation of the information processing circuit 11 is started so as to output an operation signal B to the voltage control circuit 13. When the operation of the information processing circuit 11 is started, the start signal A of the input/output control circuit 12 changes from logical low level to logical high level but the voltage control circuit 13 continues to output the oscillation clock signal D output from the input/output control circuit 12 to the booster circuit 14 while the operation signal B from the information processing circuit 11 is logical low level. The information processing circuit 11 changes the operation signal B from logical low level to logical high level when the processing is finished, and the oscillation in the circuit 11 and the function thereof are stopped. When the operation signal B is changed to logical high level, the voltage control circuit 13 stops the supply of the booster control signal E to the booster circuit 14. When the boosting is stopped, the battery voltage is supplied to all the circuitry through the diode 16.

Figure 4:
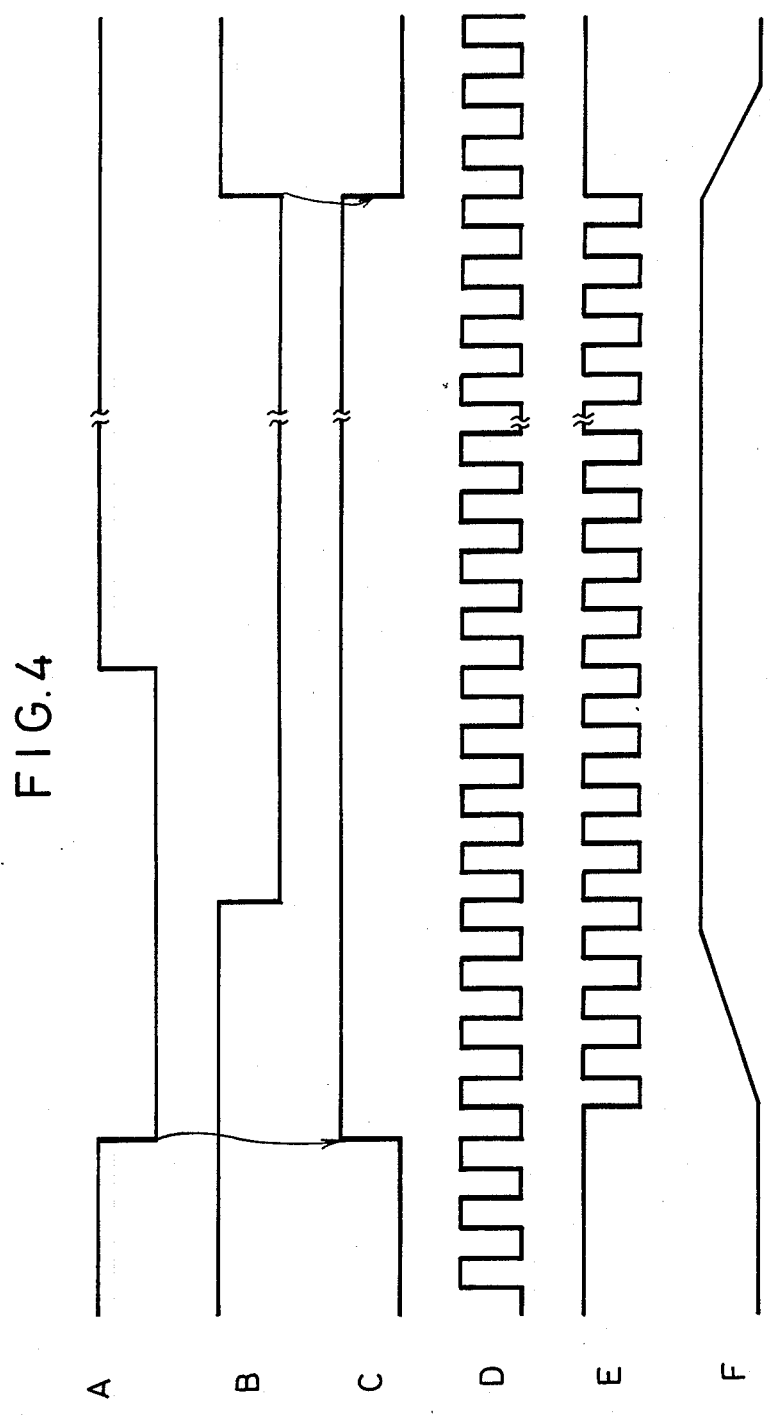
FIG. 4 shows the operation timing of the circuitry shown in FIG. 3.

The operation timing of the circuitry shown in FIG. 3 will now be explained with reference to FIG. 4. The timing waveforms A to F are the waveforms at the points A to F, respectively, shown in FIG. 3. The output A of the input/output control circuit 12, which is ordinarily logical high level, becomes logical low level when a key is depressed and the CPU 19 must start. When the start signal A becomes logical low level, the output C of the 2-input NAND gate 24 becomes logical high level and the 2-input NAND gate 23 inverts the oscillation clock output D of the input/output control circuit 12 and outputs in the form of the output E. The booster circuit 14, which has received the output E as the booster control signal, starts to boost the voltage F supplied to all the circuitry. When the CPU 19 starts operation, the operation signal B becomes logical low level, and the start signal A changes to logical high level. Even when the start signal A becomes high level, since the operation signal B remains low level, the output C of the 2-input NAND gate 24 remains high level, so that the 2-input NAND gate 23 continues to sent the booster control signal E. When the start signal A is changed to high level and the operation signal B is also changed to high level, the output C of the 2-input NAND gate 24 becomes low level. No clock signal is then output to the output E of the 2-input NAND gate 23 and the booster circuit 14 stops the function and the supply voltage F is lowered down to the battery voltage.

In the above-described structure, while the information processing circuit 11 is not in operation, the information processing circuit 11 and the booster circuit 14 are stopped and the other circuits are operated at a low voltage, while only when it is necessary to operate the information processing circuit 11, the booster circuit 14 is operated so as to supply a voltage which the information processing circuit 11 requires.

As explained above, since all the circuitry are operated at a low voltage at ordinary times and only when a key is depressed and the information processing circuit 11 is operated, the battery voltage is boosted to generate a voltage which is necessary for operating the information processing circuit 11, the power consumption and the number of batteries can be reduced, thereby reducing the size and the weight of the portable data collecting and processing apparatus.

What is claimed is:

1. A portable data collecting and processing apparatus having at least one battery therein, comprising:
   keyboard means for selectively entering data and commands into the apparatus, said keyboard means having a plurality of keys;
   input control means coupled with said keyboard means for coding the data and commands entered into said keyboard means and outputting a signal corresponding to the coded data or commands and a start signal;
   information processing means coupled with said input control means for processing the signal provided by said input control means and outputting a processed signal, said information processing means having an operation mode and a stop mode and outputting an operation signal during the operation mode;
   display means coupled to said information processing means for displaying information corresponding to the processed signal from said information processing means;
   voltage control means coupled with said input control means and said information processing means, said voltage control means receiving said start signal from said input control means and said operation signal from said information processing means, and outputting a booster control signal; and
   power supply means including a booster circuit for boosting a voltage of said at least one battery, said power supply means being coupled with said voltage control means and said battery for selecting either a voltage obtained by boosting the battery voltage or said battery voltage in accordance with said booster control signal from said voltage control means and supplying the selected voltage to said input control means, said information processing means, and said voltage control means.

2. A portable data collecting and processing apparatus as defined in claim 1, wherein said information processing means is comprised of a central processing unit and at least one memory.

3. A portable data collecting and processing apparatus as defined in claim 1, wherein said power supply means is comprised of said booster circuit, a voltage stabilizing circuit coupled to an output terminal of said booster circuit, and a diode coupled to an input terminal of said booster circuit and an output terminal of said voltage stabilizing circuit.

* * * * *